United States Patent [19]
Kwon et al.

[11] Patent Number: 5,524,183
[45] Date of Patent: Jun. 4, 1996

[54] DATA TRANSMITTING APPARATUS FOR THE THERMAL PRINT HEAD OF HIGH DENSITY

[75] Inventors: Seong W. Kwon, Ichon-kun; Shin W. Kang, Songpa-ku; Young B. Lee, Eunpyeong-ku, all of Rep. of Korea

[73] Assignee: Hyundai Electronics Industries Co., Ltd., Kyoungkido, Rep. of Korea

[21] Appl. No.: 930,327

[22] Filed: Aug. 14, 1992

[30] Foreign Application Priority Data

Aug. 16, 1991 [KR] Rep. of Korea ............ 1991-14145
Apr. 7, 1992 [KR] Rep. of Korea ............ 1992-5756

[51] Int. Cl.$^6$ ........................................ G06F 15/00
[52] U.S. Cl. ........................................ 395/114; 395/115
[58] Field of Search ........................ 358/402, 404, 358/444, 442, 523, 524; 395/164, 165, 166, 114, 112, 101, 107, 108, 109, 104, 115, 116, 200.01, 200.07, 200.08, 200.09, 200.16, 200.2, 823, 824, 829, 833, 840, 842, 843, 846, 848, 857, 859, 860, 891, 894, 300, 309, 311, 410, 412, 413, 415, 416, 417, 419, 421.1, 421.01, 421.07, 421.08, 421.11; 346/154, 200, 275, 325, 400; 347/142

[56] References Cited

U.S. PATENT DOCUMENTS

| 4,809,216 | 2/1989 | Lai | 364/900 |
| 4,876,651 | 10/1989 | Dawson et al. | 364/449 |
| 5,046,023 | 9/1991 | Katsura et al. | 364/518 |

*Primary Examiner*—Mark R. Powell
*Assistant Examiner*—Dov Popovici
*Attorney, Agent, or Firm*—Darby & Darby

[57] ABSTRACT

This invention provides a data transmitting apparatus for the thermal print head of high density with a plurality of data input lines, which comprises a image interface 1, a latch 2, a memory selector 3, a image memory 4, a buffer 5, a P/S converter 6, a DMA controller 7, an address generator, and an address comparator 8, for performing a function of rapid transmitting the image data by means of DMA to the TPH.

10 Claims, 6 Drawing Sheets

DATA TRANSMITTING APPARATUS FOR THE THERMAL PRINT HEAD OF HIGH DENSITY

BACKGROUND OF THE INVENTION

The present invention relates to data transmitting techniques which provide image data to thermal print head (TPH) in a facsimile system or the like and, more particularly, to a data transmitting apparatus for the thermal print head (TPH) of high density with a plurality of data input lines adopted to increase thermal printing speed.

A conventional facsimile system has utilized the thermal print head (TPH) with only one data input line. Therefore, it took a long time to print the image data by the TPH because the data was, in regular sequence, transmitted to the TPH by the data transmitting apparatus having only one image data memory.

By the way, in the conventional system, since the TPH had a low resolution and data transmission rate between Group III facsimile systems was slow, the data transmitting apparatus had no serious problem.

But, in a Group IV facsimile system connected to digital network a TPH has a high resolution, and data transmission rate between Group IV facsimile systems is very fast. Accordingly, a system for embodying the above conditions is required, and recently a data transmitting apparatus was suggested in order to increase thermal printing speed. The recent apparatus adopted a TPH of high density with a plurality of data input lines.

However, because the recent apparatus had only one image memory, several problems were caused. That is to say, in the case that the apparatus overall depends upon the only one image memory, although to print a high density image could be realized, but the above recent apparatus had difficulty in real time data processing, because it still took a long time to output the image data from the memory to the TPH through the data input lines, in sequence.

SUMMARY OF THE INVENTION

It is an object of the present invention to provide a data transmitting apparatus for the thermal print head (TPH) of high density with a plurality of data input lines which has the same number of memory modules to the plurality of data input lines, and separately stores the image data in accordance with addresses divided equally in each memory module, and transmits the image data of a selected same address from each memory module to the TPH, simultaneously, thereby reducing the output time of an image.

To achieve the object, the present invention provides a data transmitting apparatus for the thermal print head of high density, comprises: a image interfacing means for decoding the image data inputted in encoded state from the outside of the apparatus, for outputting the decoded data to a memory address and data bus, and for generating addresses to transmit the decoded image data and a DMA start signal for informing the start of DMA operation; a latching means connected to said image interfacing means, for separating the memory addresses from the data which are multiplexed with the image data and the memory addresses, for latching the addresses, and for reforming the latched addresses in order to be adapted to a plurality of memory modules; a memory selecting means connected to said image interfacing means and said latching means, for generating memory module select signals for storing the image data in the memory modules in sequence, and for selecting all the memory modules simultaneously when the stored image data are transmitted by means of DMA to the TPH of high density; a image memory means connected to said latching means and to said memory selecting means, and composed of a plurality of memory modules; a buffering means connected to said image interfacing means and said image memory means, and composed of a plurality of buffer modules, for connecting between said image interfacing means and said image memory means when the image data is inputted from said image interfacing means on the other side, and for blocking the passage between said image interfacing means and said image memory means when the image data is outputted from said image memory means; a P/S converting means connected to said image interfacing means and said image memory means, and composed of a plurality of P/S converter modules, for converting parallel data which is inputted from said image memory means into serial data, and for outputting to the data input lines of the TPH; a DMA control means connected to said image interfacing means, said P/S converting means and said address generating means, for generating a clock and control signals for which the image data is outputted by means of DMA operation to the TPH, and for generating a DMA end signal; an address generating means connected to said image interfacing means, said image memory means and said DMA control means, for generating addresses of said image memory means; and an address comparing means connected to said DMA control means and said address generating means, for performing a function of supervising the amount of image data transmitted by means of DMA to the TPH.

BRIEF DESCRIPTION OF THE DRAWINGS

The present invention is illustrated by way of example and not limitation in the figures of the accompanying drawings, in which like references indicated similar elements, and in which.

DETAILED DESCRIPTION OF THE PREFERRED EMBODIMENTS

Figure 1:
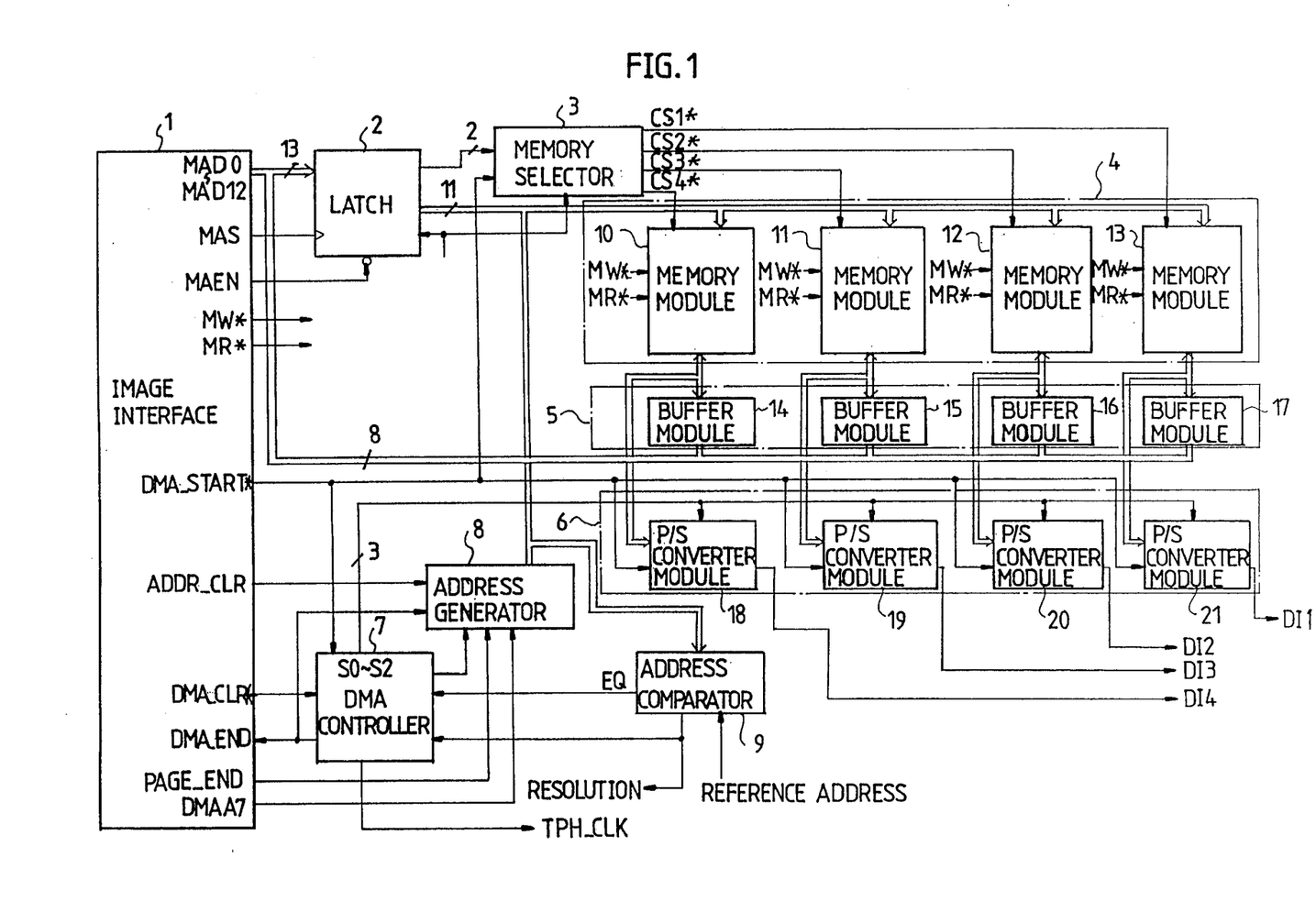
FIG. 1 is a schematic block diagram of an embodiment of a data transmitting apparatus for a TPH according to the present invention.

Now, referring to FIG. 1, this is shown an embodiment of a data transmitting apparatus for the TPH of high density according to the present invention as a preferred case having four memory modules.

In FIG. 1, reference numeral 1 denotes a image interface, 2 denotes a latch, 3 denotes a memory selector, 4 denotes an image memory, 5 denotes a buffer, 6 denotes a parallel to serial converter (which will be referred to as the P/S converter, hereinafter), 7 denotes a direct memory access (DMA) controller, 8 denotes an address generator, 9 denotes an address comparator, 10 to 13 denote memory modules, 14 to 17 denote buffer modules, and 18 to 21 denote P/S converter modules.

A data transmitting apparatus of the present invention, as shown in FIG. 1, comprises an image interface 1, a latch 2, a memory selector 3, an image memory 4, a buffer 5, a P/S converter 6, a DMA controller 7, an address generator 8, and an address comparator 9, wherein each essential unit connected to other units and organically operates.

The image interface 1 is connected to the latch 2, the buffer 5, the P/S converter 6, the DMA controller 7, the address generator 8 and the address comparator 9. Under the control of a central processing unit (CPU) (not shown) on the outside, the image interface 1 decodes the image data inputted in encoded state from the outside of the apparatus, and outputs the decoded image data to a memory address and data bus (MADB). Also, the image interface 1 generates addresses in order to transmit the decoded data to the image memory 4, and generates a DMA start signal (DMA_START) for informing the start of DMA operation to other units (3, 5, 6 and 7).

The latch 2 is connected to the image interface 1, the memory selector 3 and the image memory 4. The latch 2 separates the memory addresses from the data on the MADB which are multiplexed with the image data and the memory addresses by the image interface 1, and latches the addresses for offering to the image memory 4 and the memory selector 3. Moreover, the latch 2 suitably re-forms the latched addresses in order to be adapted to the image memory 4 which consists of several modules. That is to say, although the image interface 1 transmits the continuous memory addresses for one line of image data to the latch 2, in the latch, after the addresses are divided into four equal parts, all of the four divided addresses are re-formed equally. Thereby each line of the divided image data is stored in each memory module of the image memory 4.

The memory selector 3 is connected to the image interface 1, the latch 2 and image memory 4. The memory selector 3 generates memory module select signals (CS0* to CS3*) for storing the image data in the four equally re-formed memory modules 10, 11, 12 and 13 of the image memory 4, in sequence. And, when the data of the image memory 4 is transmitted by means of DMA to the TPH of high density, the memory selector 3 simultaneously selects all the memory modules 10, 11, 12 and 13.

The image memory 4 is connected to the latch 2, the memory selector 3, the buffer 5 and the P/S converter 6. The image memory 4 consists of four memory modules as the same number of data input lines of the TPH. In this preferred embodiment, as the memory module, a 64K byte of DRAM or SRAM is used.

The buffer 5 is connected to the image interface 1 and the image memory. The buffer 5 consists of four buffer modules as the same number of the memory modules. The buffer 5 connects between the image interface 1 and the image memory 4 when the image data is inputted from the image interface 1 on the other side, and the buffer 5 blocks the passage between the image interface 1 and the image memory 4 when the image data is outputted from the image memory 4.

The P/S converter is 6 connected to the image interface 1, the image memory 4 and DMA controller 7. The P/S converter 6 consists of four P/S converter modules, and each of them is connected to a memory module. The P/S converter 6 converts parallel data which is inputted from the image memory 4 into serial data, and the P/S converter 6 outputs the converted serial data to the data input lines of the TPH.

The DMA controller 7 is connected to the image interface 1, the P/S converter 6, the address generator 8 and the address comparator 9, and operated by the DMA start signal (DMA_START) from the image interface 1. The DMA controller 7 generates a clock and several control signals for storing the image data in the image memory 4, and for outputting the stored image data in the TPH, by means of DMA operation. Also, this DMA controller 7 generates a DMA end signal (DMA_END) when the DMA operation for outputting the image data is finished.

The address generator 8 is connected to the image interface 1, the image memory 4, the DMA controller 7 and the address comparator 9. And the address generator 8 generates addresses of the image memory 4 in order to operate DMA by using the clock from the DMA controller 7.

The address comparator 9 is connected to the DMA controller 7 and the address generator 8. The address comparator 9 performs a function of supervising the amount of image data which is transmitted by means of DMA to the TPH.

The above-mentioned data transmitting apparatus for the TPH of high density operates as follows.

If the amount of image data for one line is inputted to the apparatus of the present invention, the image interface 1 outputs the image data in order to store in the image memory 4. And the memory selector 3 controls the image memory having four memory modules 10, 11, 12 and 13 so that, in regular sequence, the image data is stored in the memory modules. At this time, the image interface 1 outputs the continuous memory addresses for one line, and the latch 2 suitably re-forms the addresses so that they are equally allocated to each memory module (refer to TABLE 2), thereby the same addresses are assigned to each memory module. Therefore, the amount of image data for one line is divided into four equal parts and is stored in the same addresses of each memory module.

So, if the image data for one line or more is not ready, the image data is transmitted by means of DMA to the TPH in due The following is the detailed statement of the above-mentioned process for transmitting the image data to the TPH.

If the image interface 1 generates a DMA start signal (DMA_START), at the same time the four memory modules 10, 11, 12 and 13 are selected by the memory selector 3. The DMA controller 7 outputs clock signal (CLK) to the address generator 8 when the DMA start signal is inputted. Then, the address generator 8 generates an address of the memory modules in order to transmit the image data. Thereby, if a byte of parallel data is inputted in each of the P/S converter modules 18, 19, 20 and 21 from the four memory modules, the DMA controller 7 generates the signals (S0, S1 and S2) so that the parallel data are converted to serial data.

Each of the P/S converter modules 18, 19, 20 and 21 converts the inputted parallel data into serial data and outputs it to the data input lines (DI1, DI2, DI3 and DI4) of the TPH. At this time, the address comparator 9 compares the address generated by address generator 8 with the standard address preset in accordance with a resolution in order to supervise the amount of image data, and the address comparator 9 generates an equal signal (EQ) in order to control whether or not they should continue DMA operation.

If the DMA controller 7 inputs the equal signal (EQ), the DMA controller 7 discontinues generating the TPH clock signal (TPH_CLK) in order to stop the DMA operation. And the DMA controller 7 generates the DMA end signal (DMA_END) and outputs it to the image interface in order to indicate that the image data has been transmitted to the TPH wholly. While the image data is transmitted to the TPH, the buffer 5 blocks the passage between the image interface 1 and the image memory 4 in order to prevent the data from colliding with other data.

Figure 2:
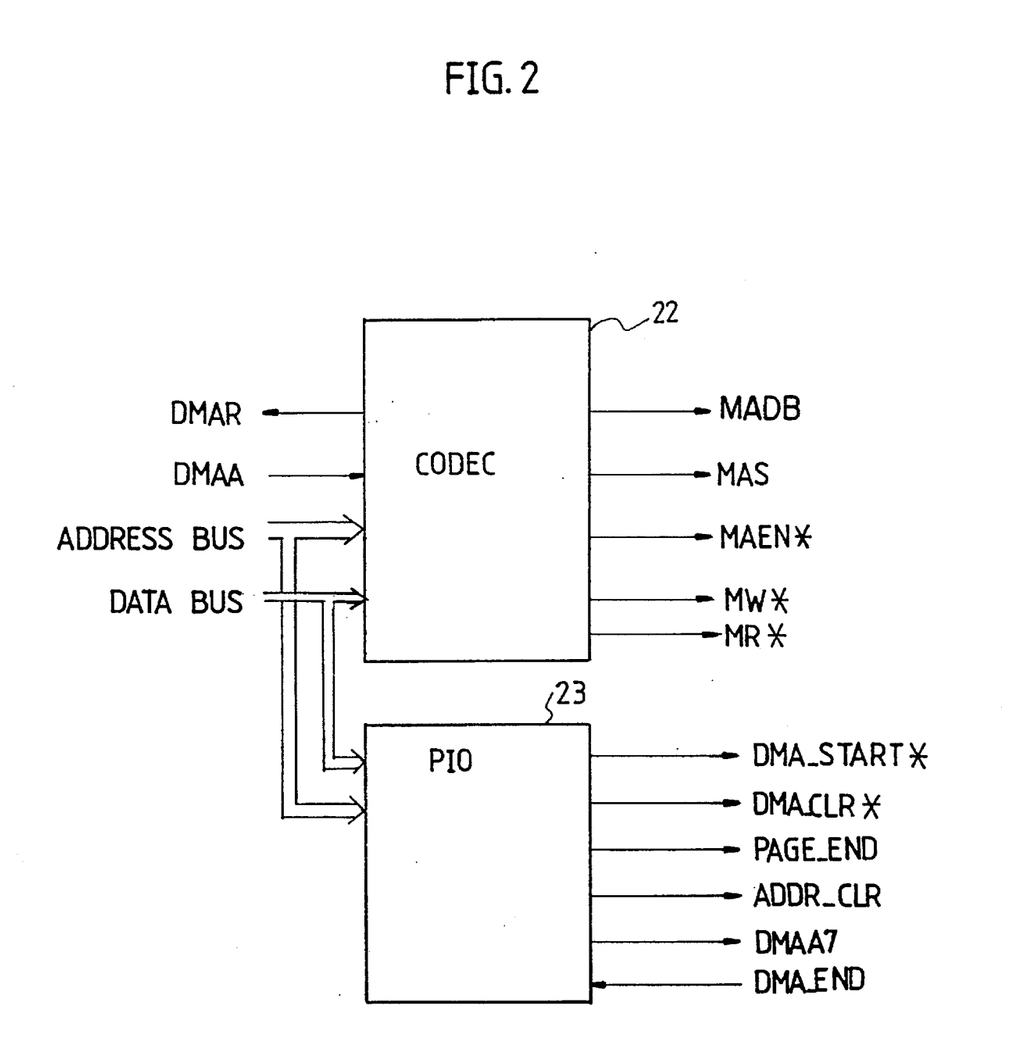
FIG. 2 is a schematic circuit diagram of an image interface according to the present invention.

Now, referring to FIG. 2, this shows a schematic circuit diagram of the image interface 1. In this drawing, reference numeral 22 denotes a coder and decoder chip (which will be referred to as the CODEC, hereinafter), and 23 denotes a peripheral input/output unit (which will be referred to as the PIO, hereinafter).

The image interface 1 comprises a CODEC 22 and a PIO 23, as shown in FIG. 2.

The CODEC 22 is connected to the CPU (not shown) on the outside through a data bus and an address bus. A CODEC generally codes or decodes the inputted data. In this case, the CODEC 22 decodes inputted data in decoding state from the outside of the apparatus and outputs the decoded data to the MADB.

The PIO 23 is connected to the CPU (not shown) on the outside through the data bus and the address bus. And the PIO 23 generates a DMA stair signal (DMA_START), a page end signal (PAGE_END) and a signal (DMAA7) for selecting the data for each of the lines in the image memory in sequence, and reads a DMA end signal (DMA_END) in order to acknowledge the end of the DMA operation.

And so, the CODEC 22 outputs the decoded data through MDAB to the buffer 5 in order to store it in the image memory 4, after the CODEC 22 decodes the inputted data. At this time, a memory address strobe signal (MAS) synchronized with the decoded data is generated and output to the latch 2. Therefore, if the image memory for one line or more is stored in the image memory 4, the DMA start signal (DMA_START) is generated by the image interface 1 in order to stair the DMA operation, that is it outputs the image data stored in the image memory 4 to the data input lines of the TPH.

Figure 3:
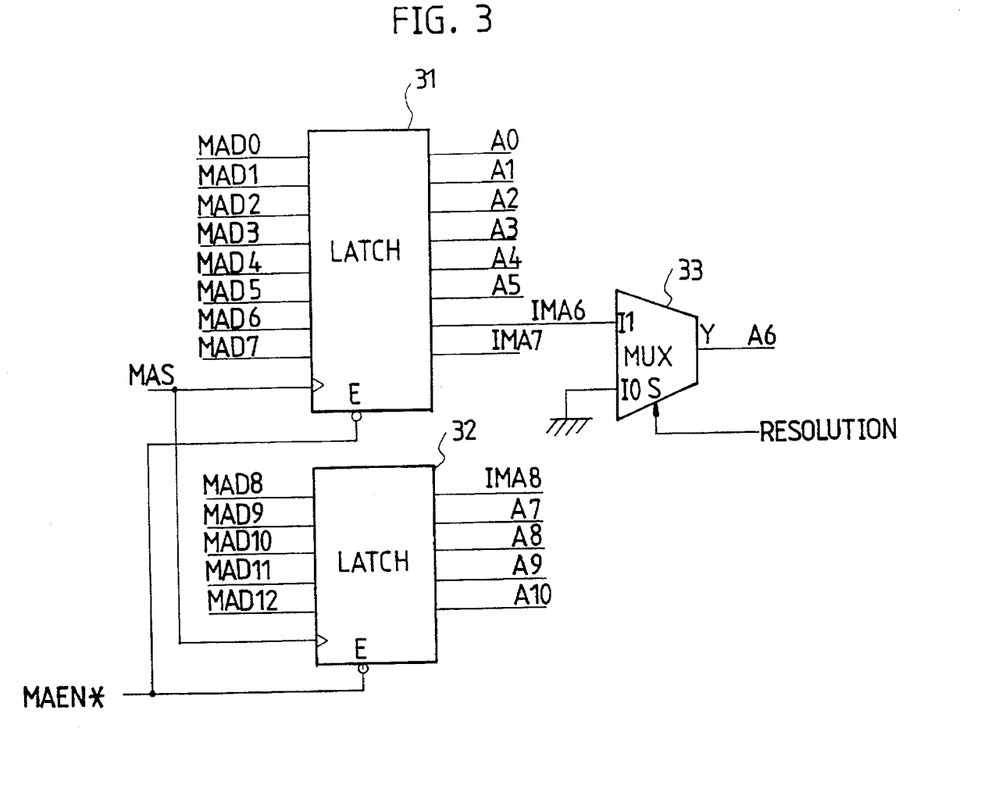
FIG. 3 is a schematic circuit diagram of a latch according to the present invention.

FIG. 3 is a schematic circuit diagram of a latch 2 in accordance with an embodiment of the present invention. In the drawing, reference numerals 31 and 32 denote latches, and 33 denotes a multiplexer (which will be referred to as the MUX, hereinafter). As shown in FIG. 3, the latch 2 comprises two latches 31 and 32, and a MUX 33 which latch the continuous addresses (MAD0 to MAD12) from the image interface 1 and output the re-formed address to the memory modules 10, 11, 12 and 13.

The latch 2 is connected to the image interface 1, memory selector 3 and image memory 4. The latch 2 synchronizes the addresses from the image interface 1 with the MAS signal, and the latch 2 suitably reforms the latched addresses in accordance with the plurality of memory modules and a resolution of the TPH. And also the latch 2 generates the addresses (IMA6 to IMA8) which are used in memory selecting.

Table 1 shows an example of address transformation in accordance with a resolution of the TPH.

TABLE 1

| Addresses of image memory | Addresses generated by the image interface | |
|---|---|---|
| | resolution 400 DPI | resolution 200 DPI |
| A0 | MAD0 | MAD0 |
| A1 | MAD1 | MAD1 |
| A2 | MAD2 | MAD2 |
| A3 | MAD3 | MAD3 |
| A4 | MAD4 | MAD4 |
| A5 | MAD5 | MAD5 |
| A6 | MAD6 | 0 |
| A7 | MAD9 | MAD9 |
| AB | MAD10 | MAD10 |
| A9 | MAD11 | MAD11 |
| A10 | MAD12 | MAD12 |

Figure 4:
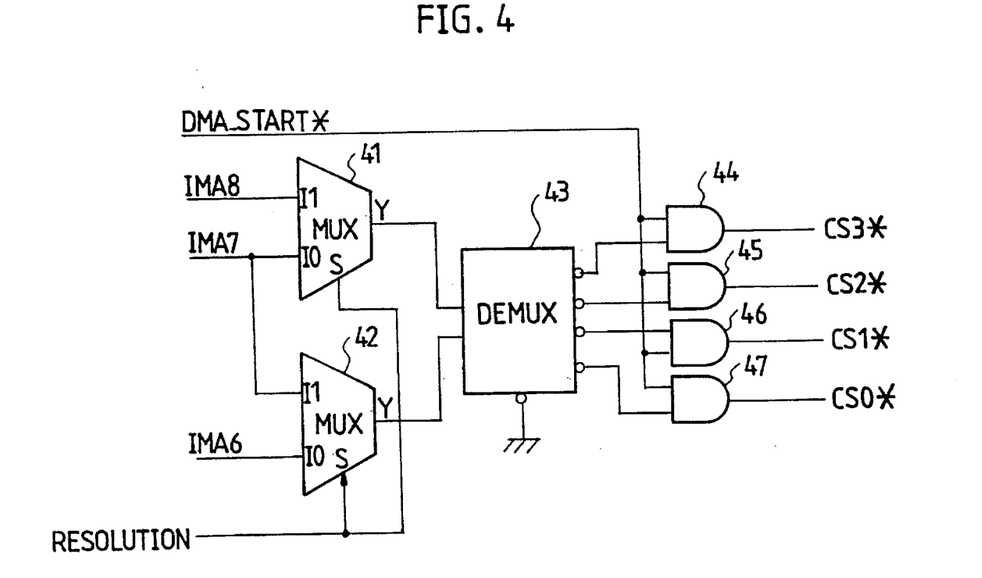
FIG. 4 is a schematic circuit diagram of a memory selector according to the present invention.

FIG. 4 is a schematic circuit diagram of a memory selector 3 in accordance with an embodiment of the present invention. In the drawing, reference numerals 41 and 42 denote MUXs, 43 denotes a demultiplexer (which will be referred to as the DEMUX, hereinafter), and 44, 45, 46 and 47 denote AND gates.

As shown in FIG. 4, the memory selector 3 comprises a MUX 41 which outputs an inputted address IMA7 or IMA8 in accordance with a resolution establishment signal (RESOLUTION), a MUX6 or IMA7 in accordance with the signal (RESOLUTION), a DEMUX 43 which is connected to the MUXs 41 and 42, and four AND gates 44, 45, 46 and 47 that each have two inputs connected to an output of the DEMUX 43 and a line for the DMA start signal (DMA_START) and output chip select signals (CS0* to CS3*).

The memory selector 3 is connected to the memory interface 1, the latch 2, and the image memory 4. And, the memory selector, in regular sequence generates the chip select signals (CS0* to CS3*) for storing the image data in the memory modules of the image memory 4. When the image data in the memory modules are transmitted to the TPH, the DMA stair signal (DMA_START*) becomes a low logic level (hereinafter, the high and low logic levels are presented by "1" and "0" respectively) thereby the memory selector 3 performs a function of selecting all the memory modules.

Table 2 shows an example of a memory select state made by the continuous addresses from the image interface, and the re-formed addresses of the four memory modules made by the latch 2.

TABLE 2

| Line memory | chip select according to addresses (MAD0–MAD12) | | | | Re-formed |
|---|---|---|---|---|---|
| No. | CS0* | CS1* | CS2* | CS3* | addresses |
| 1 | 000H-07FH | 080H-0FFH | 100H-17FH | 180H-1FFH | 000H-07FH |
| 2 | 200H-27FH | 280H-2FFH | 300H-37FH | 380H-3FFH | 080H-0FFH |
| 3 | 400H-47FH | 480H-4FFH | 500H-57FH | 580H-5FFH | 100H-17FH |
| 4 | 600H-67FH | 680H-6FFH | 700H-77FH | 780H-7FFH | 180H-1FFH |
| 5 | 800H-87FH | 880H-8FFH | 900H-97FH | 980H-9FFH | 200H-27FH |
| 6 | A00H-A7FH | A80H-AFFH | B00H-B7FH | B80H-BFFH | 280H-2FFH |
| 7 | C00H-C7FH | C80H-CFFH | D00H-D7FH | D80H-DFFH | 300H-37FH |
| 8 | E00H-E7FH | E80H-EFFH | F00H-F7FH | F80H-FFFH | 380H-3FFH |
| 9 | 1000H-107FH | 1080H-10FFH | 1100H-117FH | 1180H-11FFH | 400H-47FH |
| 10 | 1200H-127FH | 1280H-12FFH | 1300H-137FH | 1380H-13FFH | 480H-4FFH |
| 11 | 1400H-147FH | 1480H-14FFH | 1500H-157FH | 1580H-15FFH | 500H-57FH |
| 12 | 1600H-167FH | 1680H-16FFH | 1700H-177FH | 1780H-17FFH | 580H-5FFH |
| 13 | 1800H-187FH | 1880H-18FFH | 1900H-197FH | 1980H-19FFH | 600H-67FH |
| 14 | 1A00H-1A7FH | 1A80H-1AFFH | 1B00H-1B7FH | 1B80H-1BFFH | 680H-6FFH |
| 15 | 1C00H-1C7FH | 1C80H-1CFFH | 1D00H-1D7FH | 1D80H-1DFFH | 700H-77FH |
| 16 | 1E00H-1E7FH | 1E80H-1EFFH | 1F00H-1F7FH | 1F80H-1FFFH | 780H-7FFH |

Figure 5:
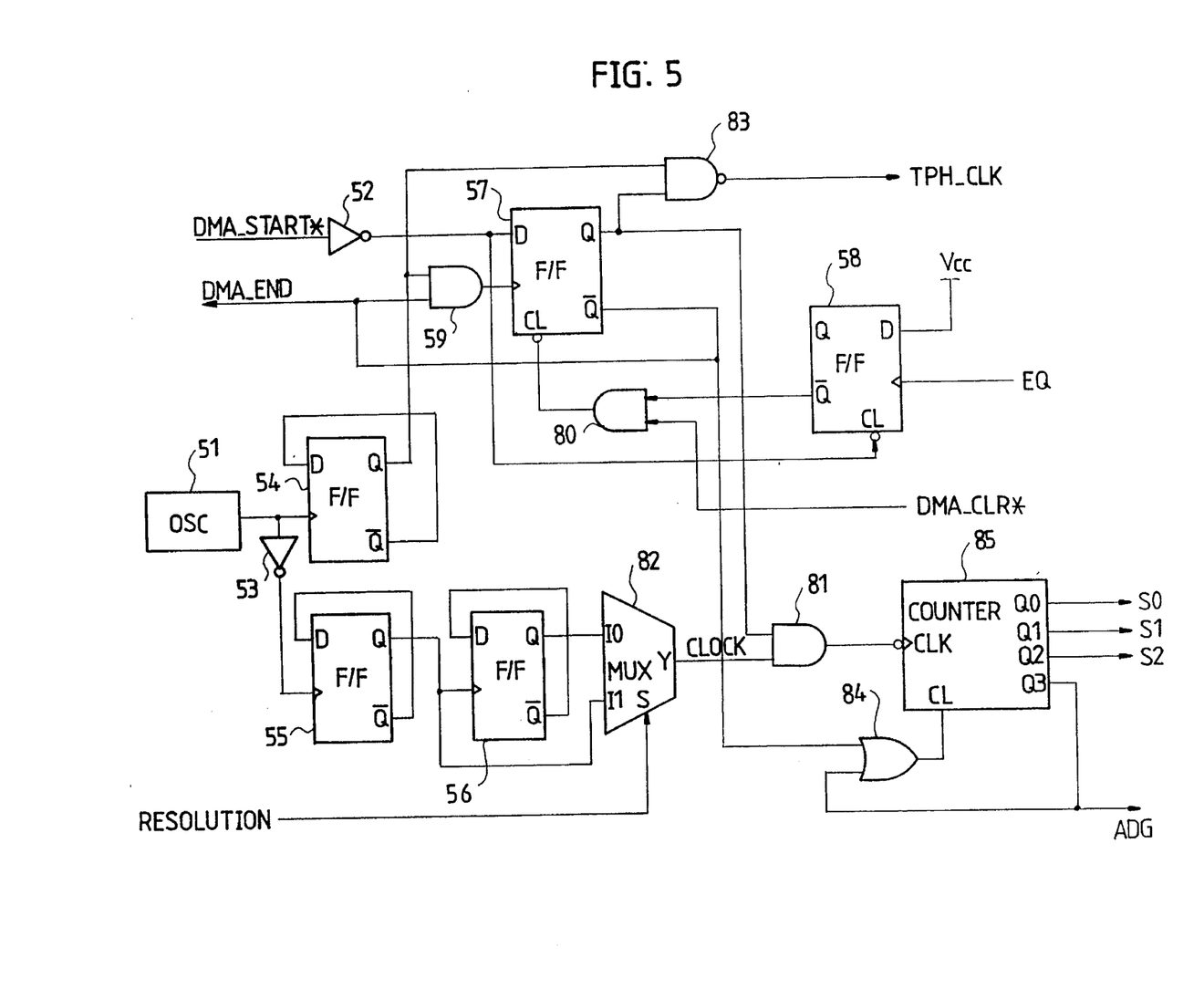
FIG. 5 is a schematic circuit diagram of a DMA controller according to the present invention.

FIG. 5 is a schematic circuit diagram of a DMA controller 7 in accordance with an embodiment of the present invention.

In the drawing, reference numeral 51 denotes an oscillator, 52 and 53 denote NOT gates, 54, 55, 56, 57 and 58 denote flip-flops, 59, 80 and 81 denote AND gates, 82 denotes a MUX, 83 denotes a NAND gate, 84 denotes an OR gate and 85 denotes a counter.

As shown in FIG. 5, the DMA controller 7 comprises an oscillator which generates a constant frequency signal, a flip-flop 54 which is connected to the oscillator 51 and which demultiplies the frequency signal into a half of the frequency, a NOT gate 53 which is connected to the oscillator 51, a flip-flop 55 which is connected to the NOT gate 53 and demultiplies the inverted frequency signal into a half of the frequency of the oscillator 51, a NAND gate 83 which is connected to the flip-flop 54 and outputs a clock (TPH_CLK) for the TPH of high density, a NOT gate 52 which inputs the DMA start signal (DMA_START) from the image interface 1, a flip-flop 58 whose data input (D) is connected to the source of electric power (Vcc) in order to input a usually high logic level signal "1", the clock input is connected to the address comparator 9 in order to input the equal signal (EQ), and the clear input (CL) is connected to the NOT gate 52, a AND gate 80 whose two inputs are connected to the inverting output of the flip-flop 58, and to the DMA clear output of the image interface 1 and which outputs a clear signal to a flip-flop 57, the flip-flop 57 whose the data input is connected to the output of the NOT gate 52, the clear input is connected to the output of the AND gate 80, and which outputs a DMA end signal (DMA_END) through the inverting output, a AND gate 59 whose two inputs are connected to the non-inverting output of the flip-flop 54 and to the inverting output of the flip-flop 57, and whose output is connected to the clock input of the flip-flop 57 in order to supply a clock, a NAND gate 83 whose two inputs are connected to the non-inverting outputs of the flip-flops 54 and 57, and which outputs a TPH clock (TPH_CLK), a flip-flop 56 whose clock input is connected to the non-inverting output of the flip-flop 55, and which, once more again, demultiplies the inputted frequency signal into a half of the frequency signal in order to make a quarter of the frequency against the frequency of the oscillator 51, a MUX 82 whose two inputs are connected to the non-inverting outputs of the flip-flops 55 and 56, and which outputs the half of the input frequency or a quarter of the frequency against the frequency of the oscillator 51 in accordance with the resolution establishment signal (RESOLUTION), a AND gate 81 whose two inputs are connected to the output of the flip-flop 57 and the output of the MUX 82 and which outputs the demultiplied clock, a counter 85 whose a clock input is connected to the output of the AND gate 81, and which produces the signals (S0 to S2) for the P/S converter modules, and a OR gate 84 whose two inputs are connected to the inverting output of the flip-flop 57 and the address generating signal (ADG) output of the counter 85, and whose output is connected to the clear input of the counter.

Before outputting an image, the image interface 1 turns the DMA clear signal (DMA_CLR*) into a logic level "0" so that the flip-flop 57 is cleared. And if the flip-flop 57 is cleared, the DMA end signal (DMA_END) becomes a logic level "1".

Therefore, at this time, if the image data for one line or more exist in the image memory 4, the DMA operation is started because the DMA start signal (DMA_START*) becomes a logic level "0".

If the DMA start signal becomes a logic level "0", the output of the NOT gate 52 becomes a logic level "1" and the non-inverting output of the flip-flop 57 becomes a logic level "1". Thus, if the output of the flip-flop 57 becomes a logic level "1", the NAND gate 83 outputs an inverted clock signal against the clock signal of flip-flop 54. This inverted clock signal is used for the TPH. Also, if the output of flip-flop 57 becomes a logic level "1", the enabled AND gate 81 offers a clock to the counter 85, the counter 85 inputs the clock and generates signals (S0 to S2) for converting a byte of parallel data into serial data. And, if the output of the counter 85 decimally becomes 8, the counter 85 is cleared by the OR gate 84 and offers the address generator 8 an address generating signal (ADG) for increasing the address.

Through repeating the above-mentioned process, the image data of the image memory modules 10, 11, 12 and 13, in regular sequence, are inputted to the P/S converter modules 18, 19, 20 and 21 each one byte.

The one byte of image data inputted to the P/S converter modules are converted into serial data and are offered to the data input lines DI1, DI2, DI3 and DI4 of the TPH. If the image data of the image memory 4 are outputted as many as a reference address, the address comparator 9 generates the equal signal (EQ). Thus, if the equal signal (EQ) becomes a logic level "1", the output of AND gate 80 becomes a logic level "0" and the flip-flop 57 is cleared. And then, the DMA end signal (DMA_END) becomes a logic level "1", and the signal is outputted to indicate to the image interface 1 the ending of DMA operation. The DMA end signal disables the NAND gate 83 and the AND gate 81 to prevent them from generating the signals for DMA operation.

Figure 6:
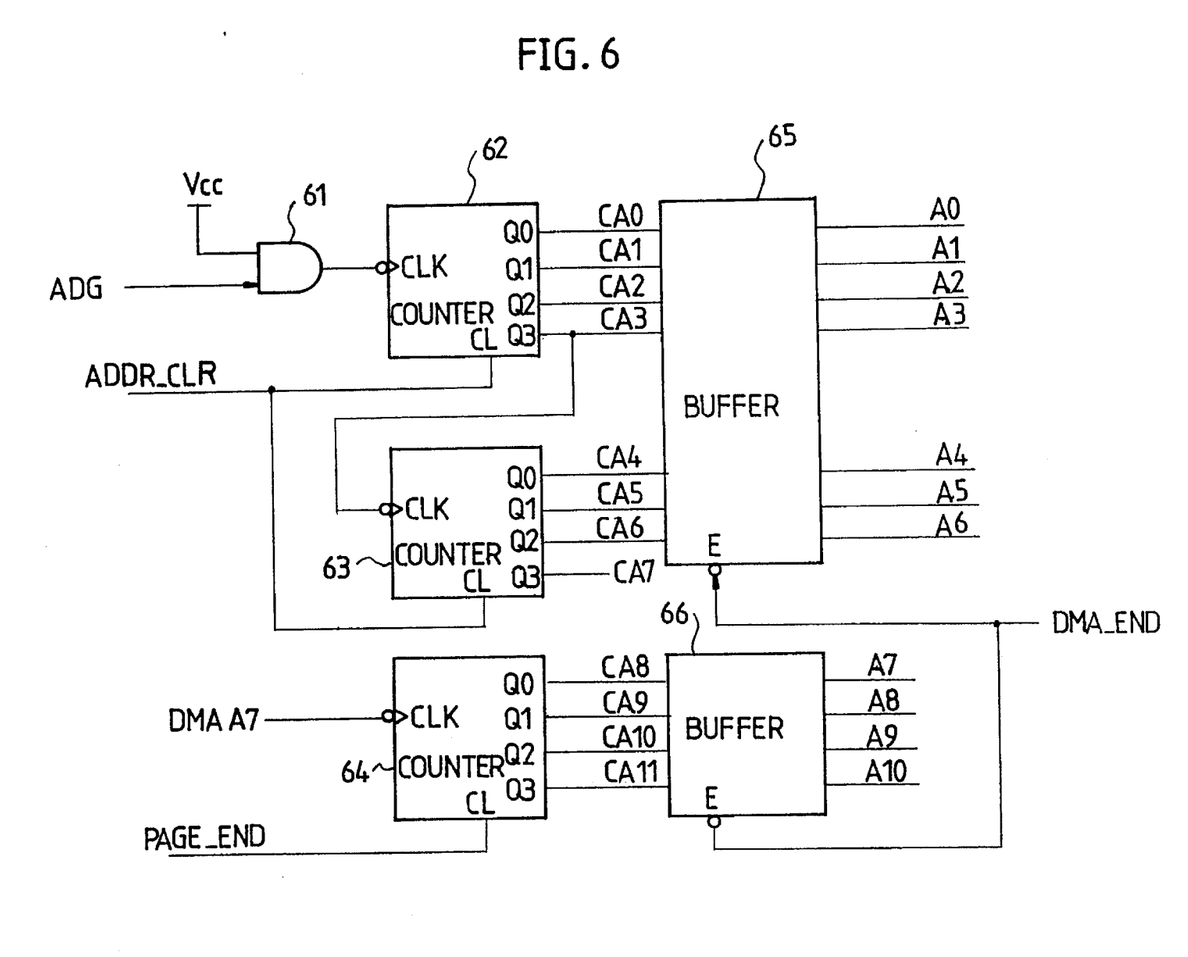
FIG. 6 is a schematic circuit diagram of an address generator according to the present invention.

FIG. 6 is a schematic circuit diagram of an address generator 8 in accordance with an embodiment of the present invention. In the drawing, reference numeral 61 denotes a NAND gate, 62, 63 and 64 denote counters, and 65 and 66 denote a buffer.

As shown in FIG. 6, the address generator 8 comprises a NAND gate 61 which is connected to the DMA controller 7 in order to input the ADG signal and the source of electric power (Vcc) in order to input a usually logic level "1", a counter 62 which is connected to the output of the NAND gate 61 and is cleared by a clear signal (ADDR_CLR) from the image interface 1, a counter 63 which is connected to the most significant output of the counter 62 and is cleared by the clear signal (ADDR_CLR), a counter whose clock input is connected to the output line for the signal (DMAA7) of the image interface 1 and which is cleared by the page end signal (PAGE_END) from the image interface, a buffer 65 which is connected to the outputs of the counters 62 and 63 and is enabled by the DMA end signal (DMA_END), a buffer 65 which is connected to the output of the counter 64 and is enabled by the DMA end signal (DMA_END).

And, the address generator 8, by using the clock from the DMA controller 7, generates the addresses for transmitting the image data to memory modules 10, 11, 12 and 13 by means of DMA operation. If the image data for one line are set up as 512 bytes, each of the memory modules 10, 11, 12 and 13 stores 128 bytes of image data so that the 512 bytes are divided into four equal pairs. In this preferred embodiment of the invention, the image memory has four memory modules with each module consisting of a 256K DRAM or SRAM unit in order to store the image data for 16 lines. In this case, the address generated by the address generator is from 000H to 7FF0 (Refer to TABLE 2).

And the address is incremented by the address generating signal (ADG) one by one. Accordingly, the image data which are stored in the memory modules 10, 11, 12 and 13 for 16 lines are transmitted to the TPH in regular order. At this time, the line is, in order, selected by using the signal DMAA7 as a counter clock signal. And the buffers 65 and 66 are enabled because the DMA end signal becomes a logic level "0" while the image data are transmitted and select the image data for which they are about to transmit.

Figure 7:
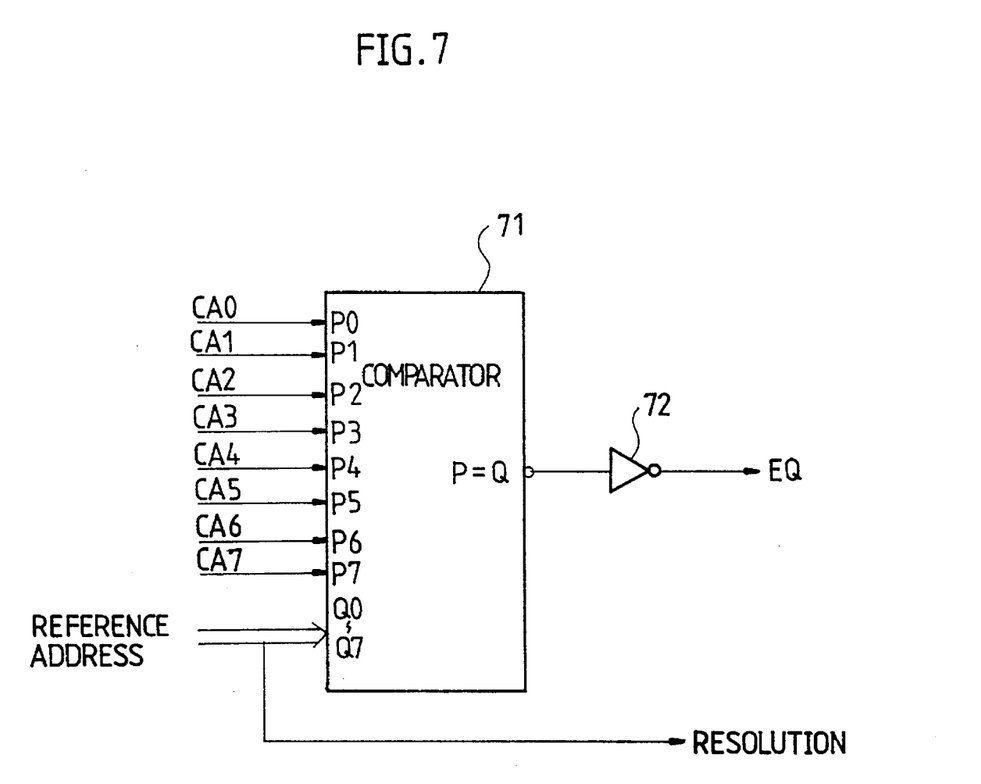
FIG. 7 is a schematic circuit diagram of an address comparator according to the present invention.

FIG. 7 is a schematic circuit diagram of an address comparator 9 in accordance with an embodiment of the present invention. In the drawing, reference numeral 71 denotes a comparator and 72 denotes a NOT gate.

The address comparator 9 comprises an 8 bit comparator 71 which is connected to the address generator 8 and a NOT gate 72 whose input is connected to the output of the 8 bit comparator 71 in order to supply the equal signal (EQ) to the DMA controller 7.

And, the address comparator 9 compares the reference address which is present with the address (CA0 to CA7) which is generated by the address generator 8. If the reference address is equal to the other address, the address comparator 9 outputs the equal signal (EQ) which is a logic level "1". Therefore, the image data are transmitted just as many as the reference address from the memory modules 10, 11, 12 and 13 to the data input lines of the TPH of high density.

In the preferred embodiment, if the resolution is 400 DPI (Dot Per Inch), the reference address presets to 80 H (Hexadecimal notation), and if the resolution is 200 DPI, the reference address presets to 40 H.

And the most significant bit (MSB) of the reference address is used as a resolution establishment signal (RESOLUTION). Therefore, when the resolution is 400 DPI, the resolution establishment signal (RESOLUTION) becomes a logic level "1", and if the resolution is 200 DPI the establishment signal (RESOLUTION) becomes a logic level "0".

The present invention is not limited to the above-mentioned embodiment and effectively transmits the image data to the TPH having a plurality of data input lines by extending the image memory in accordance with the data input lines of the same number.

Therefore, the apparatus according to the present invention can apply to Group IV facsimile system or the like, and provides an effect of reducing a transmission time of the image data.

What is claimed is:

1. A data transmitting apparatus for a thermal print head of high density with a plurality of data input lines, comprising:

a image interfacing means for decoding image data inputted in encoded state from outside of the apparatus, for generating memory addresses and image data to transmit decoded image data to a memory address and data bus, and for generating a direct memory access clear signal and a direct memory access start signal for informing the start of a direct memory access operation;

a latching means connected to said image interfacing means, for separating said memory addresses from said image data which are multiplexed on said memory address and data bus, for latching said memory addresses, and for re-forming the latched memory addresses in order to be adapted to a plurality of memory modules;

a memory selecting means connected to said image interfacing means and said latching means, for generating memory module select signals for storing the image data in the plurality of memory modules in sequence, and for selecting all the memory modules simultaneously when the stored image data are transmitted by means of direct memory access to the thermal print head of high density;

a image memory means connected to said latching means and to said memory selecting means, and comprising said plurality of memory modules;

a buffering means connected to said image interfacing means and said image memory means, and comprising a plurality of buffer modules, for connecting said image interfacing means and said image memory means when the image data is inputted from said image interfacing means, and for disconnecting said image interfacing means from said image memory means when the image data is outputted from said image memory means;

a parallel to serial converting means connected to said image interfacing means and said image memory means, and comprising a plurality of parallel to serial converter modules, for converting parallel data which is inputted from said image memory means into serial data, and for outputting to said data input lines of the thermal print head;

a direct memory access control means connected to said image interfacing means, said parallel to serial converting means and an address generating means, for generating a clock and control signals for which the image data is outputted by means of said direct memory access operation to the thermal print head, and for generating a direct memory access end signal;

said address generating means connected to said image interfacing means, said image memory means and said direct memory access control means, for generating addresses of said image memory means; and an address comparing means connected to said direct memory access control means and said address generating means, for generating an equal signal and performing a function of supervising the amount of image data transmitted by means of said direct memory access to the thermal print head.

2. A data transmitting apparatus according to claim 1, wherein said plurality of memory modules of said image memory means correspond to the data input lines of the thermal print head.

3. A data transmitting apparatus according to claim 2, wherein said buffering means comprises said plurality of buffer modules corresponding to said plurality of memory modules.

4. A data transmitting apparatus according to claim 3, wherein said parallel to serial converting means comprises said plurality of parallel to serial converter modules corresponding to the plurality of memory modules.

5. A data transmitting apparatus according to claim 1, wherein said latching means comprises:

a first and a second latch connected to said image interfacing means, said memory selecting means and said image memory means; and a first multiplexer connected to said first latch and said memory selecting means, for synchronizing the memory addresses from said image interfacing means with a memory address strobe (MAS) signal, and for suitably re-forming the latched memory addresses in accordance with the plurality of memory modules and a resolution of the thermal print head, and for generating said memory addresses used in said memory selecting means.

6. A data transmitting apparatus according to claim 5, wherein said memory selecting means comprise:

a second and a third multiplexer for outputting an inputted memory address in accordance with a resolution establishment signal;

a demultiplexer connected to said second and third multiplexers; and a first, a second, a third and a fourth AND gate connected to an output of said demultiplexer and a line for the direct memory access start signal of said image interfacing means, for outputting chip select signals.

7. A data transmitting apparatus according to claim 1, wherein said direct memory access control means comprises:

an oscillator for generating a constant frequency signal;

a first flip-flop connected to said oscillator, for dividing the constant frequency signal into a half of the frequency and having an inverting output and a noninverting output;

a first NOT gate connected to said oscillator for generating an inverted frequency signal;

a second flip-flop having a data input, a clock input and a noninverting output and a inverting output, the data input being connected to the inverting output and the clock input being connected to an output of said first NOT gate for dividing the inverted frequency signal into a half of the frequency of said oscillator;

a second NOT gate having an input and an output for inputting the direct memory access start signal from said image interfacing means and generating an inverted direct memory access start signal at its output;

a third flip-flop having a data input, a clock input, a clear input and an inverting output, the data input being connected to a source of electric power in order to input a usually high logic level signal, the clock input being connected to an address comparator in order to input an equal signal and the clear input being connected to said second NOT gate;

a first AND gate having a first input and a second input and an output, the first input being connected to said inverting output of said third flip-flop and the second input connected to the direct memory access clear signal of said image interfacing means, for outputting the clear signal;

a fourth flip-flop having a data input, a clock input, a clear input and a noninverting output and an inverting output, the data input being connected to an output of said second NOT gate, the clear input being connected to the output of said first AND gate, for outputting the direct memory access end signal through the inverting output of said fourth flip-flop;

a second AND gate having a first input and a second input and an output, said first input of said second AND gate being connected to the non-inverting output of said first flip-flop and the second input of said second AND gate being connected to said inverting output of said fourth flip-flop, and said output of said second AND gate being connected to the clock input of said fourth flip-flop in order to offer a clock;

a NAND gate having a first input and a second input and an output, said first input of said NAND gate being connected to the noninverting output of said first flip-flop and the second input being connected to the noninverting output of said fourth flip-flop for outputting at said output of said NAND gate a thermal prim head clock;

a fifth flip-flop having a data input, a clock input, and a noninverting output and a inverting output of said fifth flip-flop, the data input being connected to the inverting output and the clock input being connected to the noninverting output of said second flip-flop, for dividing the inputted frequency signal in half in order to generate a quarter of the frequency of said oscillator;

a multiplexer having a first input and a second input and an output, the first input being connected to the non-inverting output of said fifth flip-flop and the second input being connected to the inverting output of said second flip-flop, for outputting a divided clock which is half or a quarter of the frequency of said oscillator in accordance with a resolution establishment signal;

a third AND gate having a first input and a second input and an output, the first input being connected to the noninverting output of said fourth flip-flop and the second output being connected to the output of said multiplexer, for outputting the divided clock;

a counter having a clock input connected to the output of said third AND gate, said counter having an output and a clear input; and a OR gate having a first input and a second input and an output, the first input being connected to the inverting output of said fourth flip-flop, the second input being connected to an output of said counter and the output being connected to the clear input of said counter.

8. A data transmitting apparatus according to claim 1, wherein said address generating means comprises:

a NAND gate having a first input and a second input and an output, the first input being connected to said direct memory access control means and the second input being connected to a source of electric power;

a first counter connected to the output of said NAND gate;

a second counter having a clock input, a clear input and a plurality of outputs, the clock input being connected to an output of said first counter and the clear input being connected to an address clear signal line;

a third counter having a clock input connected to said image interfacing means;

a first buffer having a plurality of inputs and outputs, and an enable input, the plurality of inputs being connected to the outputs of said first and second counters and the enable input being connected to the direct memory access end signal; and a second buffer having a plurality inputs and outputs, and an enable input, the plurality of inputs being connected to the outputs of said third counter and the enable input being connected to the direct memory access end signal.

9. A data transmitting apparatus according to claim 1, wherein said address comparing means comprises:

a comparator connected to said address generating means for comparing addresses inputted from said address generating means with reference addresses; and a NOT gate connected to an output of said comparator, for providing said equal signal to said direct memory access control means.

10. A data transmitting apparatus according to claim 1, wherein said image interfacing means comprises:

a decoding means for decoding inputted image data in encoded state, for generating a memory address strobe signal synchronized with the decoded image data, and for outputting the decoded image, data to a memory address and data bus; and a peripheral input/output means for generating the direct memory access start signal, a page end signal and a signal for selecting the decoded image data for each line in the image memory modules in sequence, for reading the direct memory access end signal in order to acknowledge the end of said direct memory access operation.

* * * * *